(12) United States Patent  
Riefe et al.

(10) Patent No.: US 8,973,944 B2  
(45) Date of Patent: Mar. 10, 2015

(54) SYSTEM AND METHOD FOR ATTACHING A STEERING COLUMN TO A VEHICLE STRUCTURE

(75) Inventors: Richard K. Riefe, Saginaw, MI (US); Ravi Ravindra, Saginaw, MI (US); David G. Motousek, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 293 days.

(21) Appl. No.: 13/484,976

(22) Filed: May 31, 2012

(65) Prior Publication Data

US 2013/0319162 A1   Dec. 5, 2013

(51) Int. Cl.
*B62D 1/184* (2006.01)
*B62D 1/19* (2006.01)

(52) U.S. Cl.
USPC ............... 280/777; 74/493; 74/495; 180/282; 188/371; 280/775

(58) Field of Classification Search
CPC .... B62D 1/192; B62D 1/195; B60R 21/0132; B60R 2021/0132; B60R 2021/01322; B60R 2021/01325; B60R 2021/01327
USPC ............. 74/493, 495; 180/282; 188/371, 376; 280/775, 777, 779
See application file for complete search history.

(56) References Cited

U.S. PATENT DOCUMENTS

| 3,373,629 | A | * | 3/1968 | Wight et al. ..................... 74/492 |
| 4,915,412 | A | * | 4/1990 | Yuzuriha et al. .............. 280/775 |
| 5,452,917 | A | * | 9/1995 | Fujiu et al. ..................... 280/777 |
| 5,673,938 | A | * | 10/1997 | Kaliszewski .................. 280/777 |
| 5,706,704 | A | * | 1/1998 | Riefe et al. ....................... 74/493 |
| 5,829,310 | A | * | 11/1998 | DePaolis ......................... 74/492 |
| 5,899,116 | A | * | 5/1999 | Armstrong et al. ............. 74/492 |
| 7,228,755 | B2 | * | 6/2007 | Armstrong et al. ............. 74/493 |
| 7,621,197 | B2 | * | 11/2009 | Manwaring et al. ............ 74/492 |
| 7,896,395 | B2 | * | 3/2011 | Cymbal et al. ................ 280/777 |
| 8,042,833 | B2 | * | 10/2011 | Johnson et al. ............... 280/777 |
| 8,430,428 | B2 | * | 4/2013 | Tinnin .......................... 280/779 |
| 2009/0212547 | A1 | * | 8/2009 | Heger ........................... 280/777 |
| 2012/0318092 | A1 | * | 12/2012 | Kuroumaru .................... 74/492 |
| 2013/0305870 | A1 | * | 11/2013 | Streng et al. ................... 74/493 |

FOREIGN PATENT DOCUMENTS

DE          10055114 A1 *  5/2002  ............... B62D 1/18

* cited by examiner

*Primary Examiner* — Paul N Dickson
*Assistant Examiner* — Laura Freedman
(74) *Attorney, Agent, or Firm* — Cantor Colburn LLP

(57) ABSTRACT

A steering column assembly comprises an upper column for supporting a steering wheel and a position lock bracket disposed about the upper column. The position lock bracket is configured to be fixed to the upper column when the position lock bracket occupies a locked mode. The position lock bracket is further configured to be selectively fixed to a rigid structure of the vehicle when operating in a fixed mode and to be instantaneously released from the vehicle structure when operating in a release mode.

14 Claims, 16 Drawing Sheets

SYSTEM AND METHOD FOR ATTACHING A STEERING COLUMN TO A VEHICLE STRUCTURE

BACKGROUND OF THE INVENTION

The present invention relates to steering columns and more particularly to systems and methods for attaching and releasing a steering column assembly to a structure of a vehicle.

In today's world, motor vehicles are commonly equipped with safety features configured to dissipate kinetic energy in the event of an impact between a vehicle occupant and an aspect of a vehicle interior. For example, a steering column may be configured to deform, and thereby absorb energy, while exerting a resistive force upon a vehicle occupant. During normal operation, the steering column may be fixed to the vehicle structure by a structural connection, which may be provided by one or more steering column couplers. Such couplers are typically configured so as to satisfy a number of mechanical or structural design criteria including providing sufficient mechanical strength to withstand both static and dynamic loads associated with normal operation of the vehicle. A steering column coupler may also be configured so as to withstand cyclic stresses and fatigue that may be encountered during the life of the vehicle. Design criteria such as these tend to call for steering column couplers having at least a minimum level of strength.

To facilitate deformation of, and energy absorption by, the steering column, the steering column couplers must also be designed to release in the event of a vehicle collision. For that reason, the steering column couplers are often configured so that the failure strength of the couplers is less than the force that is likely to be exerted on the steering column couplers by a vehicle occupant in the event of a vehicle collision. At the same time, so as to avoid unintended releases, the failure strength of the couplers must be greater than forces that are likely to be exerted on the steering column couplers through incidental contacts with vehicle occupant. Still further, the failure strength of the couplers tends to be increased so as to meet mechanical strength and durability requirements described above. As a result, conventional steering column couplers may require break away forces that are greater than would otherwise be desirable, imposing excessive and possibly injurious loads upon vehicle occupants in the event of a vehicle collision.

Accordingly, it is desirable to have an improved system and method for coupling a steering column assembly to a vehicle structure providing acceptable structural integrity and design life while also facilitating release at acceptable loads upon the occurrence of an impact event.

SUMMARY OF THE INVENTION

In accordance with a first aspect of the invention, an exemplary steering column assembly comprises an upper column for supporting a steering wheel and a position lock bracket disposed about the upper column. The position lock bracket is configured to be fixed to the upper column when the position lock bracket occupies a locked mode. The position lock bracket is further configured to be selectively fixed to a rigid structure of the vehicle when operating in a fixed mode and to be instantaneously released from the vehicle structure when operating in a release mode.

In accordance with a second aspect of the invention, an exemplary method for coupling a steering column assembly to a vehicle structure comprises providing an upper column for supporting a steering wheel and disposing a position lock bracket about the upper column. The position lock bracket is configured to be selectively fixed to a rigid structure of the vehicle when operating in a fixed mode and to be instantaneously released from the vehicle structure when operating in a release mode. The position lock bracket is fixed to the upper column when the position lock bracket occupies a locked mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The present invention provides an improved system and method for coupling a steering column assembly to a vehicle structure providing acceptable structural integrity and design life while also facilitating release at acceptable loads upon the occurrence of an impact event. The present invention further provides a system and method for attaching a steering column assembly to a vehicle structure wherein the steering column assembly may be controllably released from the vehicle structure in the event of a vehicle collision without requiring a peak load to be exerted between the vehicle occupant and the steering column assembly. As used herein, the term peak load refers to a load (i.e., force) associated with structural failure of a component such as a mechanical coupler for structurally connecting two or more components.

Figure 1:
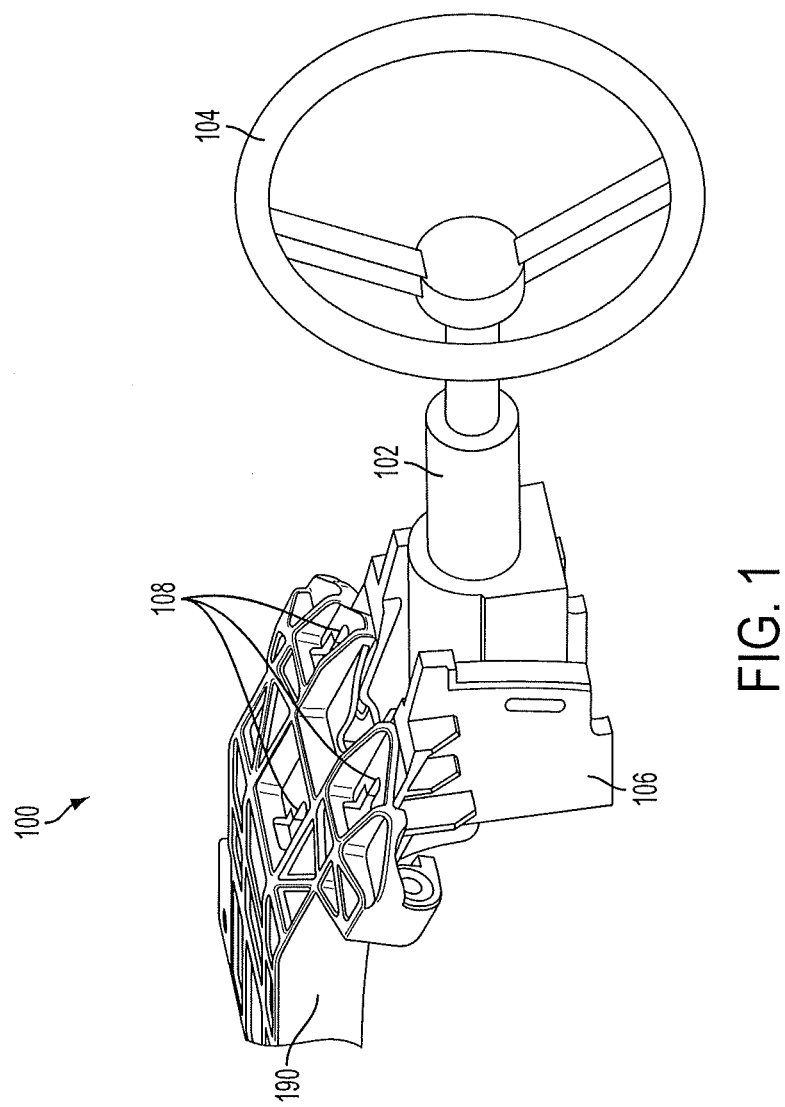
FIG. 1 shows a perspective view of an exemplary steering column assembly.

Referring now to the Figures, where the invention will be described with reference to specific embodiments, without limiting same, FIG. 1 shows a perspective view of a steering column assembly 100. As shown in FIG. 1, the steering column assembly 100 comprises an upper column 102 that supports a steering wheel 104 positioned proximate an operator (not shown) of the vehicle. In the exemplary embodiment of FIG. 1, the steering column assembly 100 includes a position lock bracket 106 disposed about the generally cylindrical upper column 102. Position lock bracket 106 facilitates selectively enabling and preventing adjustments to the position of the steering wheel 104. As used herein, the term selectively refers to the capability to switch from one mode of a plurality of modes to another mode of the plurality of modes. To accomplish this, the position lock bracket 106 is configured to be fixed with respect to the upper column 102 when the position lock bracket 106 occupies a locked mode while also being configured to be moveable relative to the upper column 102 when the position lock bracket 106 occupies an adjustment mode.

In embodiments that provide for telescoping adjustments of the steering column assembly 100, the position lock bracket 106 is configured to selectively provide for such telescoping adjustments while in an adjustment mode and to prevent such telescoping adjustments while in the locked mode. Similarly, in embodiments that provide for raking adjustments of the steering column assembly 100, the position lock bracket 106 is configured to selectively provide for such raking adjustments while in an adjustment mode and to prevent such raking adjustments while in the locked mode.

During normal operation of the vehicle, the position lock bracket 106 is fixed to the vehicle and occupies a locked mode such that it is also fixed to the upper column 102. To enhance vehicle safety in situations in which the vehicle encounters an excessive acceleration such that a vehicle occupant may impact or press against the steering column, the position lock bracket 106 is configured to selectively release from the vehicle. For example, the position lock bracket 106 (and/or the mechanism that fixes the position of the position lock bracket 106 relatively to the vehicle) is configured such that, upon the occurrence of a predefined event (such as a collision involving the vehicle, a vehicle acceleration that exceeds a predetermined threshold magnitude, or another trigger event sensed or deduced by a vehicle controller), the position lock bracket 106 (and the upper column 102 with respect to which the position lock bracket 106 may be positionally locked) releases, or is released, from its fixed attachment to the vehicle. As such, the position lock bracket 106 is configured so that, upon such release, it may be able to move relatively to the vehicle in at least one direction, such as along a horizontal direction along a longitudinal axis of the vehicle and/or the steering column.

In an exemplary embodiment, the position lock bracket 106 includes one or more controllable couplers 108 that selectively fix the position lock bracket 106 to a structure 190 of the vehicle and/or selectively release the position lock bracket 106 from its attachment to a structure 190 of the vehicle. In an exemplary embodiment, controllable couplers 108 are configured such that, when an acceleration of the vehicle exceeds a predetermined threshold magnitude, the controllable couplers 108 may switch to a release mode and thereby release the position lock bracket 106 (and the upper column 102 to which the position lock bracket 106 is fixed) from a state of being attached or fixed to the vehicle. Thus, the controllable couplers 108 provide a means for fixing the position lock bracket 106 and the upper column 102 in nominal mounting position, while also facilitating release of the steering column assembly in the event of a sudden deceleration (or other event) involving the vehicle.

Figure 2:
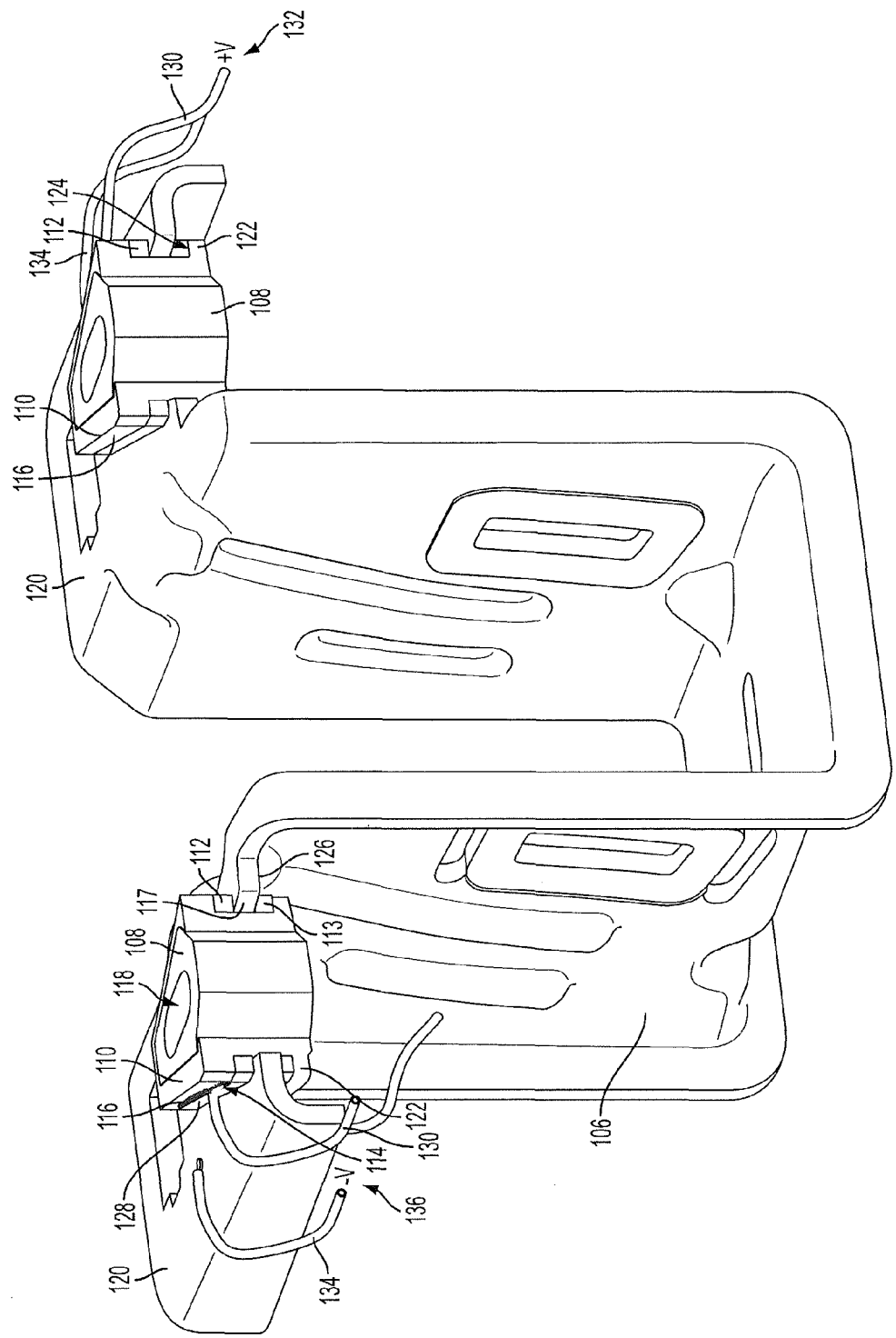
FIG. 2 shows a portion of a steering column assembly with an exemplary controllable coupler.

FIG. 2 shows a position lock bracket 106 assembled with a controllable coupler 108. The controllable coupler 108 comprises a structural grommet assembly 110 comprising an upper flange 116 and a lower flange 122 structurally coupled by an axial member (e.g., a member formed from the union of a first axial grommet link 142 and a mating second axial grommet link 144 as shown in FIG. 8, FIG. 9, FIG. 11, and FIG. 12). A first switchable interface 112 is disposed against a flange lower surface 114 of the upper flange 116 of the grommet assembly 110 so as to define an internal gap 117 for placement of a portion of the position lock bracket 106. The grommet assembly 110 defines a central hole 118 passing through the grommet assembly 110 so as to accommodate a mounting bolt (not shown) and thereby facilitate attachment of the controllable coupler 108 to a rigid structure of the vehicle.

As shown in FIG. 2, in an exemplary embodiment, the controllable coupler 108 is mated to the position lock bracket 106 such that a portion of the position lock bracket 106 is disposed within the internal gap 117. More specifically, the first switchable interface 112 is disposed between the flange lower surface 114 of the upper flange 116 and a bracket upper surface 120 of the position lock bracket 106. A second switchable interface 113 is disposed between a flange upper surface 124 of the lower flange 122 and a bracket lower surface 126 of the position lock bracket 106.

In an exemplary embodiment the first switchable interface 112 and the second switchable interface 113 each comprise a piezoelectric layer 128 that exhibits piezoelectric properties. As used herein, the term "piezoelectric properties" refers to the properties exhibited by certain materials (e.g., crystals) through which objects comprising the materials produce a voltage in response to application of a mechanical stress (i.e., strain) upon the object. Similarly, piezoelectric materials, when subjected to an externally applied electromotive potential, can change shape and/or exert mechanical forces upon adjacent structures. Put another way, objects comprising piezoelectric materials are dimensionally responsive to changes in electromotive potential.

Exemplary materials known to exhibit piezoelectric properties include quartz analogue crystals such as berlinite (AlPO4) and gallium orthophosphate (GaPO4) in addition to ceramic materials with perovskite or tungsten-bronze structures (BaTiO3, KNbO3, LiNbO3, BiFeO3, NaxWO3, Ba2NaNb5O5, Pb2KNb5O15). Polymer materials such as rubber, wool, hair, wood fiber, and silk exhibit some piezoelectric properties. The polymer polyvinylidene fluoride, PVDF, exhibits substantial piezoelectric properties several times larger than quartz.

In accordance with this exemplary embodiment, a first electrically conductive lead 130 is electrically coupled to each first switchable interface 112 so as to facilitate application of a first electromotive potential 132 to the piezoelectric layer 128 of the first switchable interface 112. A second electrically conductive lead 134 is electrically coupled to the position lock bracket 106 so as to facilitate application of a second electromotive potential 136 (e.g., a neutral electromotive potential) to the position lock bracket 106. The piezoelectric layer 128 is configured so as to be dimensionally responsive to differences between the first electromotive potential 132 applied to the piezoelectric layer 128 and the second electromotive potential 136 applied to the position lock bracket 106. For example, in a first excitation state associated with a first difference in electromotive potential, the piezoelectric layer 128 is configured so as to occupy a first thickness when subjected to a reference pressure condition. In a second excitation state associated with a second difference in electromotive potential, the piezoelectric layer 128 occupies a second thickness when subjected to the same reference pressure condition. Accordingly, thickness of the piezoelectric layer 128, and therefore the first switchable interface 112, can be controlled by modulating the difference in electromotive potential.

In addition, forces exerted by the first switchable interface 112 upon adjacent structures can be controlled by modulating the same difference in electromotive potential. As such, by modulating the difference in electromotive potential applied between the switchable interface 112 and the adjacent position lock bracket 106, a compressive load may be selectively applied and relieved between the flange lower surface 114 of the upper flange 116 and the bracket upper surface 120 of the position lock bracket 106. Similarly, by modulating a difference in electromotive potential applied between the second switchable interface 113 and the adjacent position lock bracket 106, a compressive load may be selectively applied and relieved between the flange upper surface 124 of the lower flange 122 and the bracket lower surface 126 of the position lock bracket 106. Accordingly, by modulating these loads, the controllable coupler 108 can be selectively fixed to the position lock bracket 106 or released from the position lock bracket 106.

In an exemplary embodiment, a vehicle controller may be configured so as to monitor acceleration or deceleration of the vehicle or other conditions that may be indicative of a need or desire to fix the position lock bracket 106 to the vehicle or to release the position lock bracket 106 from the vehicle. Upon satisfaction of one or more predetermined criteria related to those acceleration or deceleration parameters or other conditions of the vehicle, the vehicle controller may fix the position lock bracket 106 to the vehicle or release the position lock bracket 106 from the vehicle by modulating the difference in electromotive potential applied to a particular switchable interface as described herein. In this way, one or more controllable coupler 108 may serves to fix the steering column assembly 100 to the vehicle during normal operation and then may instantaneously release the steering column assembly 100 upon the occurrence of a vehicle collision, thereby reducing the peak load that may be experienced by a vehicle occupant impacting the steering wheel.

Figure 3:
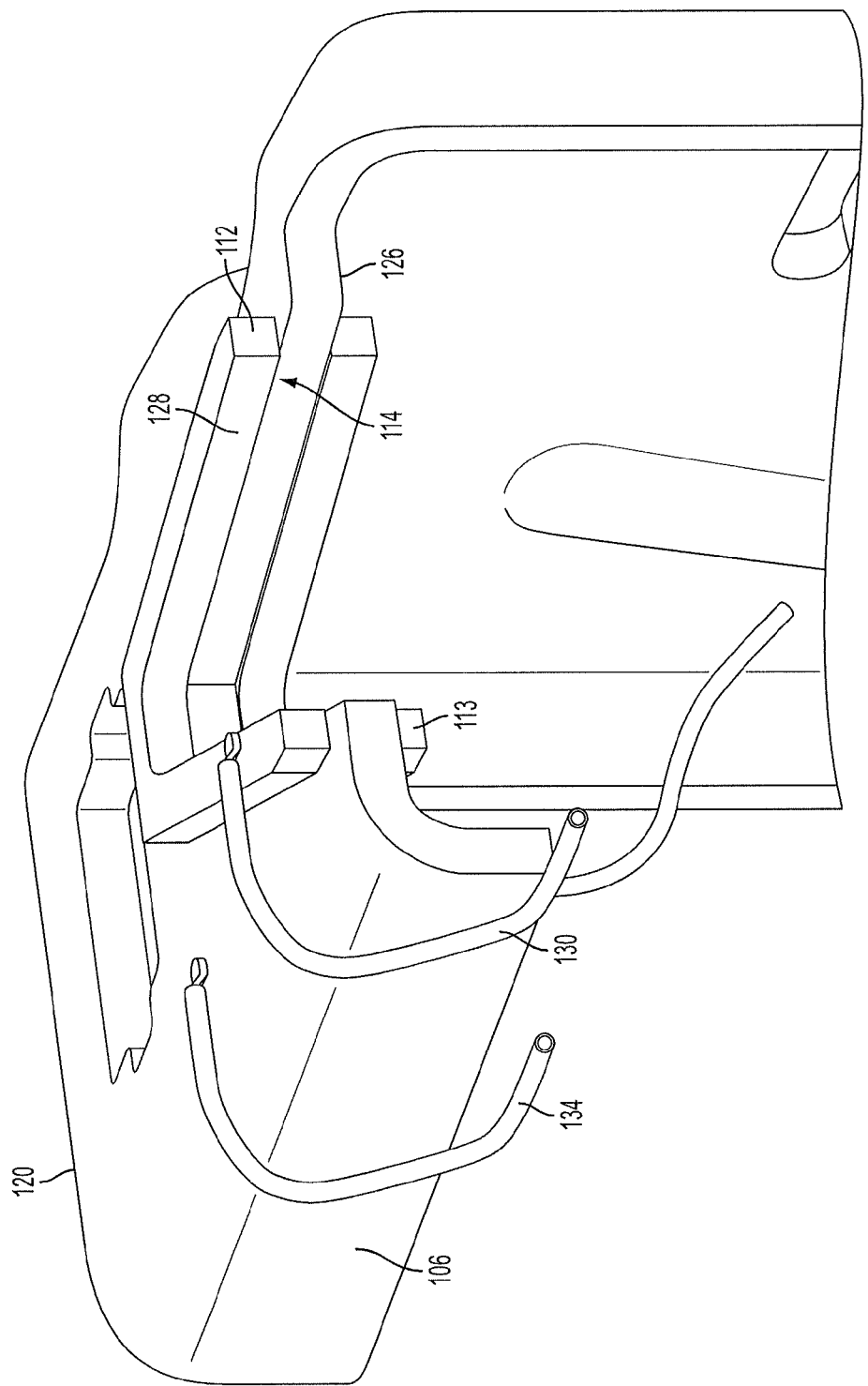
FIG. 3 shows a portion of a steering column assembly with a portion of an exemplary controllable coupler.
Figure 4:
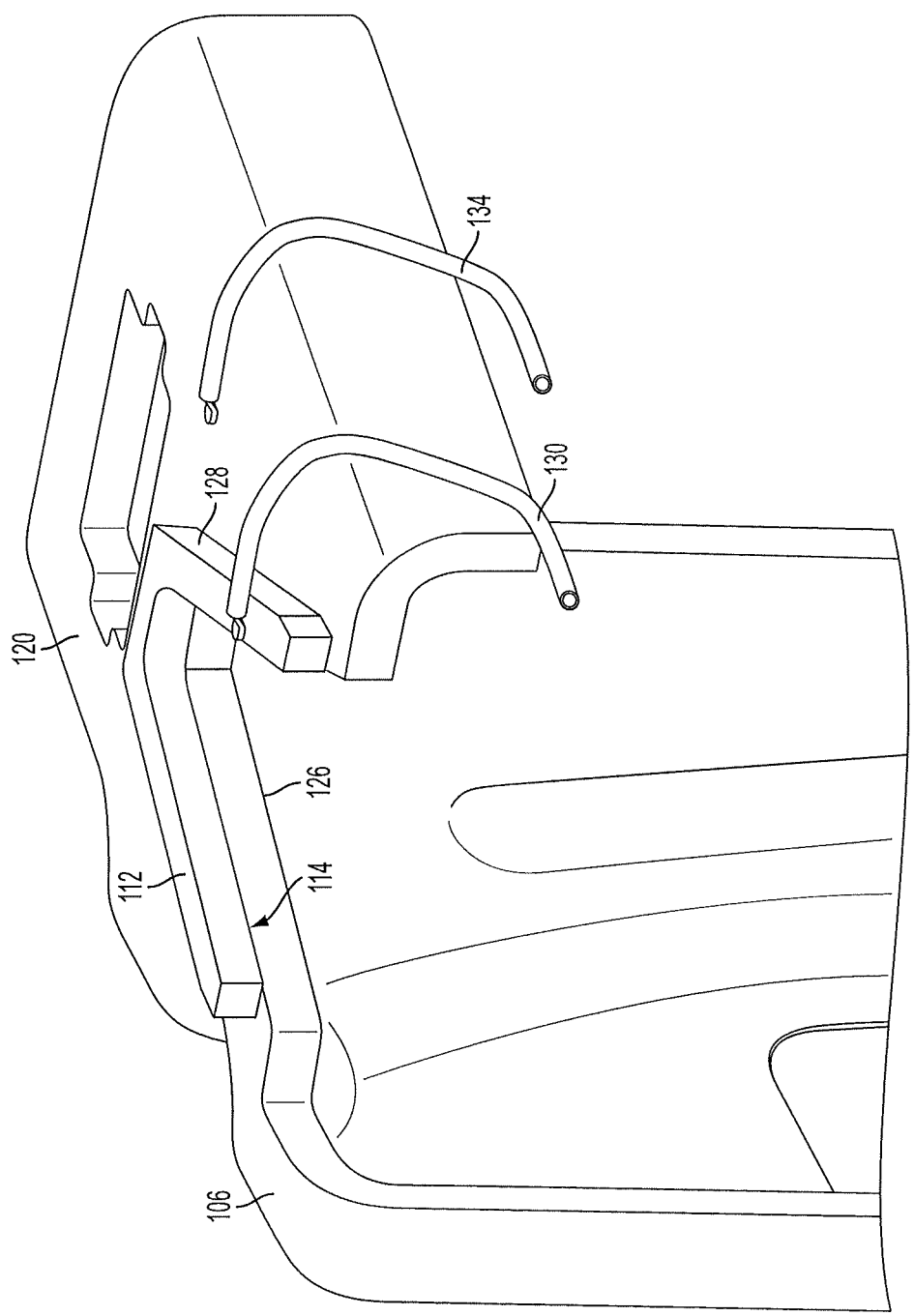
FIG. 4 shows a portion of a steering column assembly with a portion of an exemplary controllable coupler.
Figure 7:
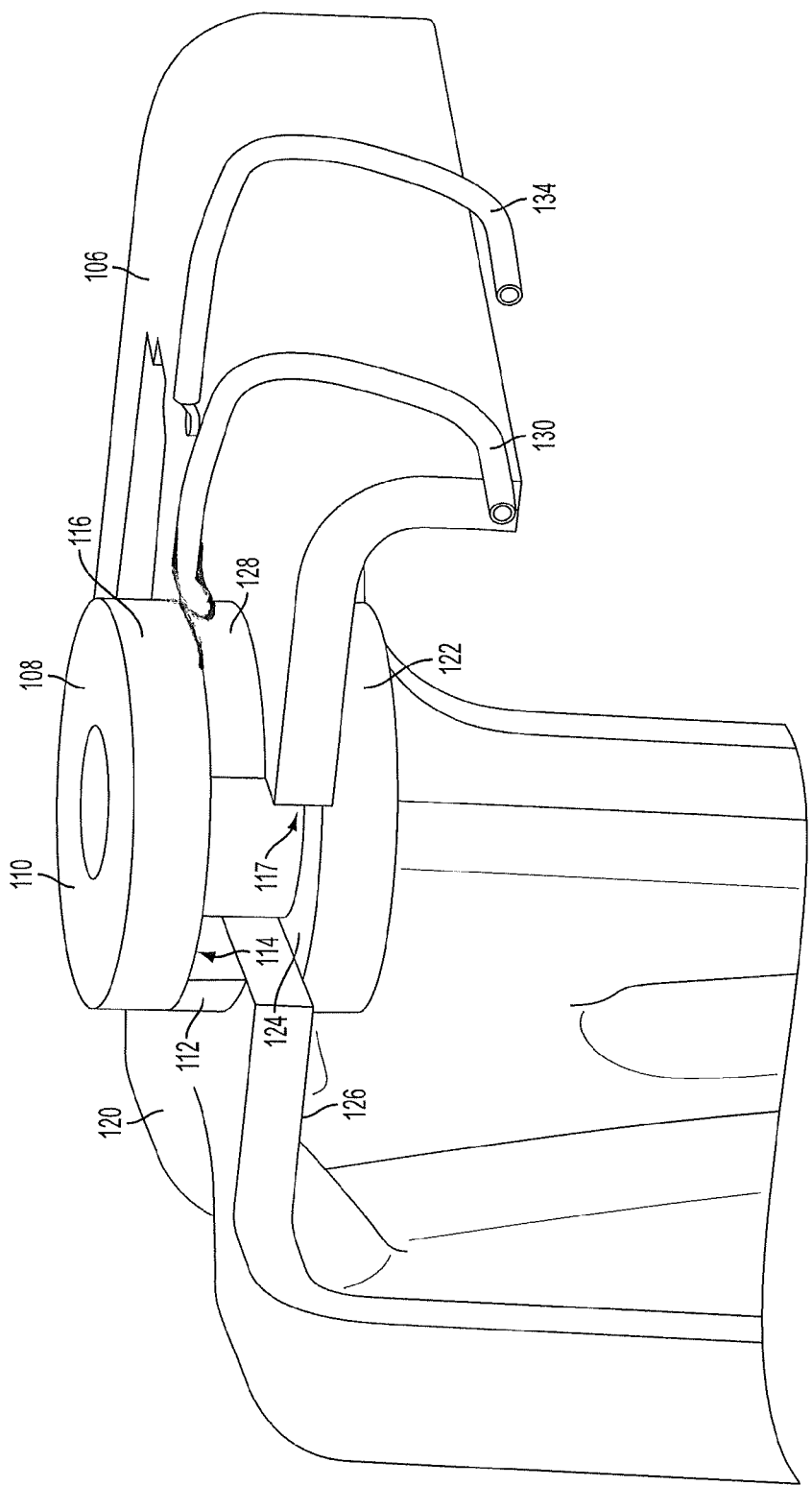
FIG. 7 shows a portion of a steering column assembly with an exemplary controllable coupler.

FIG. 3 illustrates an enlarged view of portions of an exemplary controllable coupler 108 comprising a first switchable interface 112 and a second switchable interface 113. FIG. 4 also illustrates an enlarged view of a portion of an exemplary controllable coupler 108, which comprises a first switchable interface 112. It should be appreciated that, as shown in FIG. 4 and FIG. 7, the first switchable interface 112 may be disposed on either side of the position lock bracket 106 so long as the first switchable interface 112 is disposed between a flange of the grommet and a surface of the position lock bracket 106.

Figure 5:
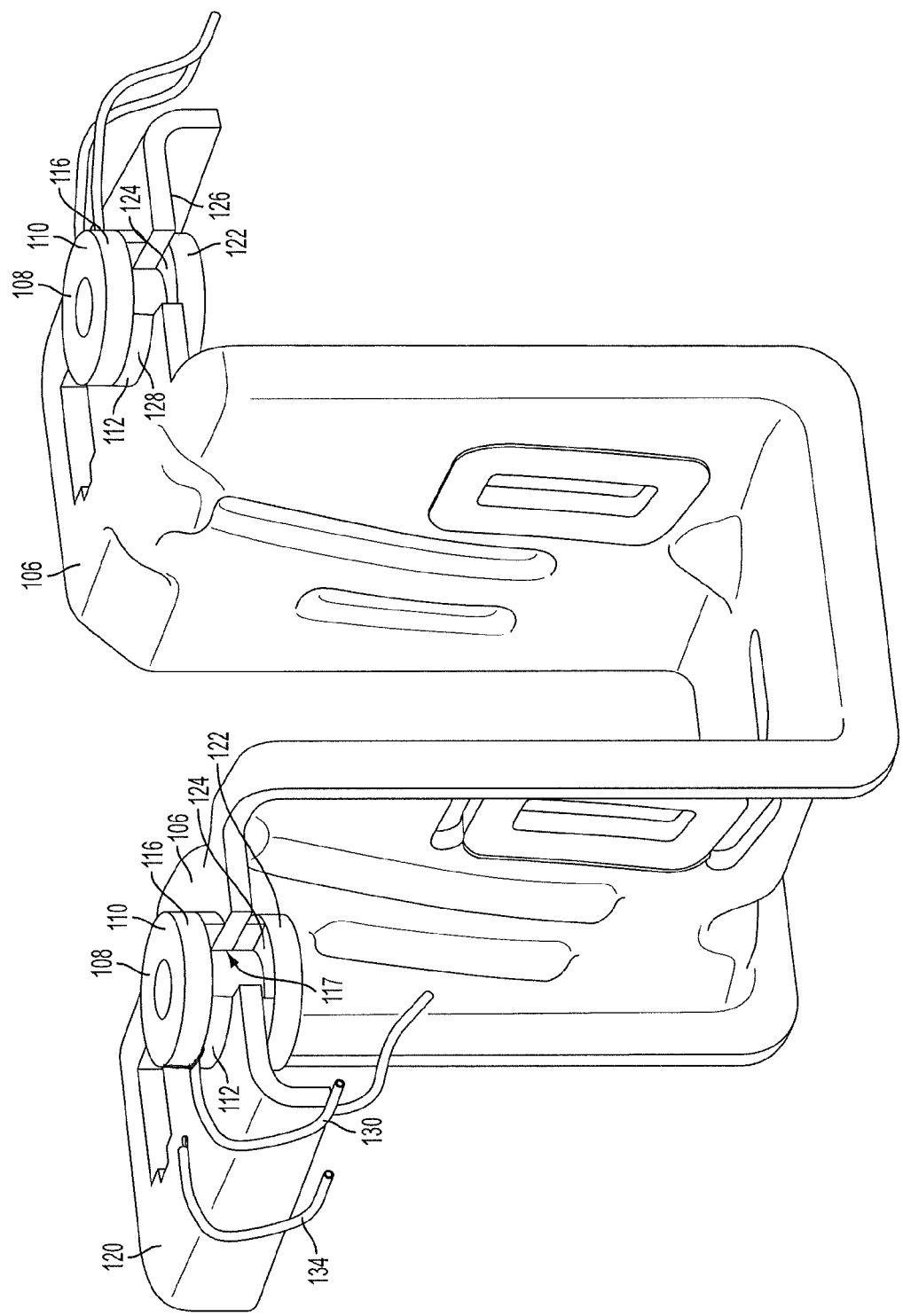
FIG. 5 shows a portion of a steering column assembly with a pair of exemplary controllable couplers.

FIG. 5 shows a pair of controllable couplers 108, each comprising a single-piece spool-shaped grommet assembly 110, and each being configured for selectively fixing and/or releasing a position lock bracket 106 to a vehicle structure (not shown). As shown in FIG. 5, the coupler on the right side differs from the coupler on the left side of the position lock bracket 106. Each of the controllable couplers 108 includes a first switchable interface 112 configured as a slotted piezoelectric disc disposed between a flange lower surface 114 of a respective grommet assembly 110 and an adjacent bracket upper surface 120 of the position lock bracket 106. The controllable coupler on the left side of the position lock bracket 106 also includes a second switchable interface disposed between a flange upper surface 124 of the lower flange 122 and the position lock bracket 106.

Figure 6:
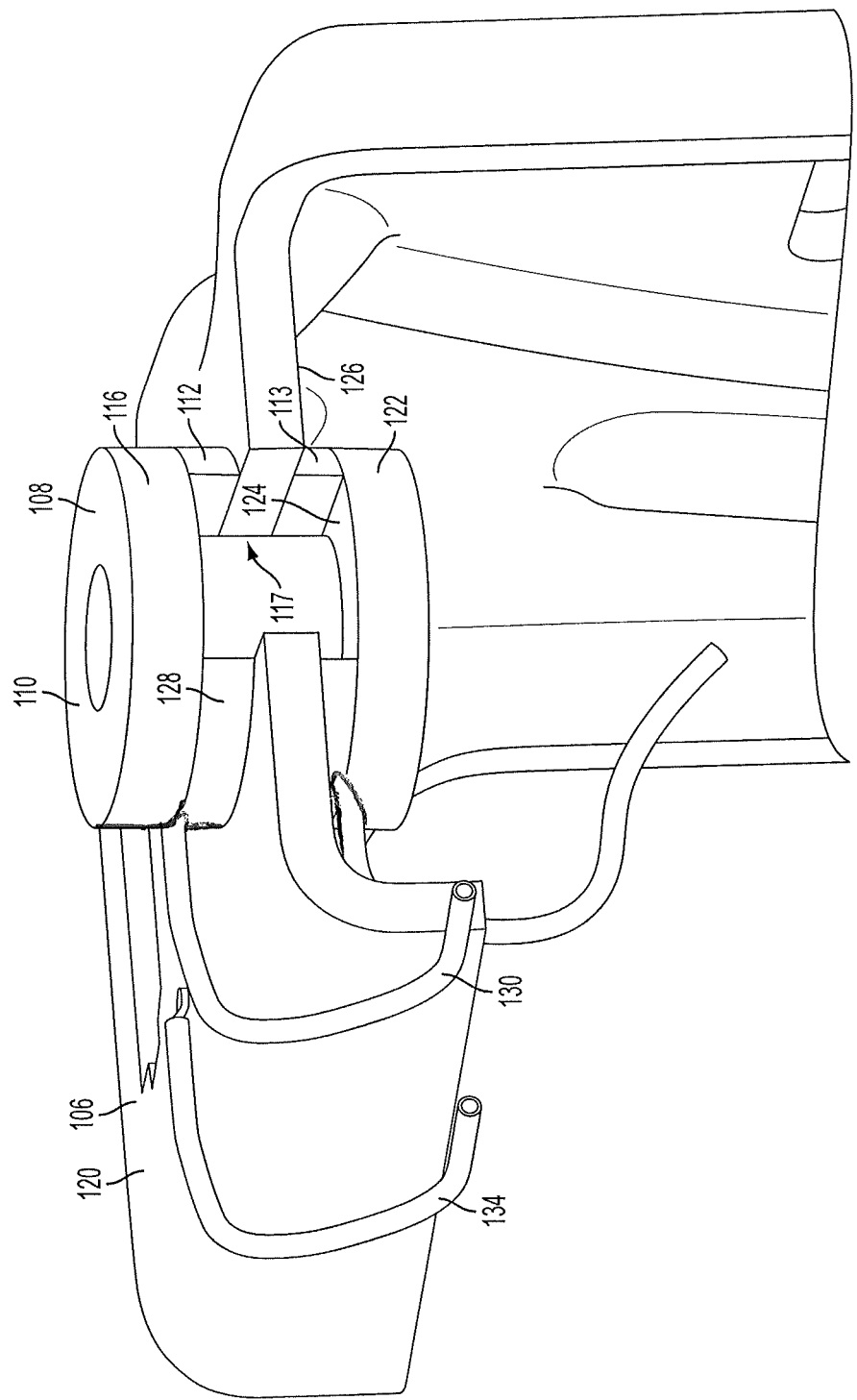
FIG. 6 shows a portion of a steering column assembly with an exemplary controllable coupler.

FIG. 6 shows an enlarged view of a controllable coupler 108 comprising a first switchable interface 112 and a second switchable interface 113, each being configured as a disc and each being coupled with a first electrically conductive lead 130. A single second electrically conductive lead 134 is coupled to the position lock bracket 106.

Figure 8:
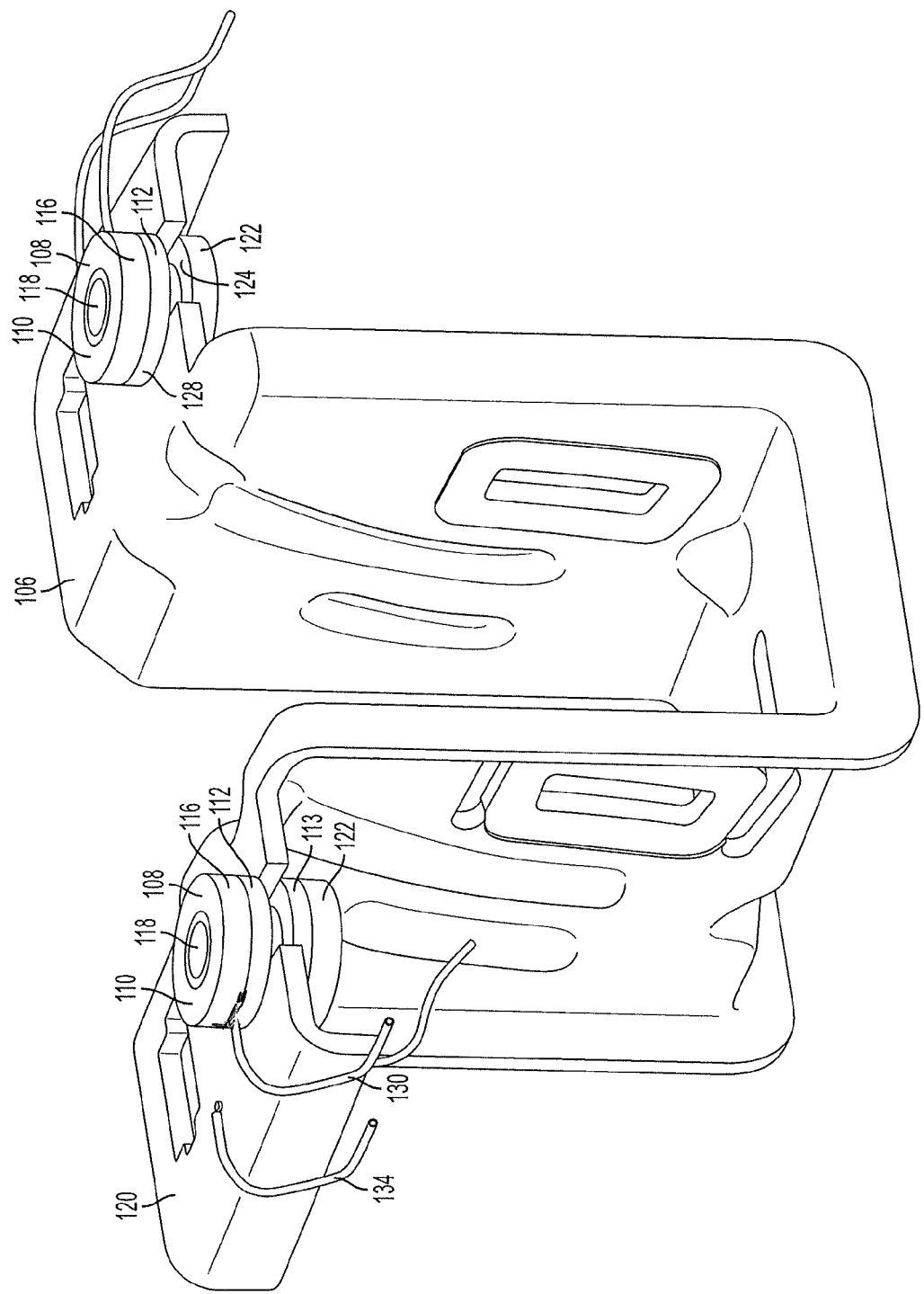
FIG. 8 shows a portion of a steering column assembly with a pair of exemplary controllable couplers.
Figure 9:
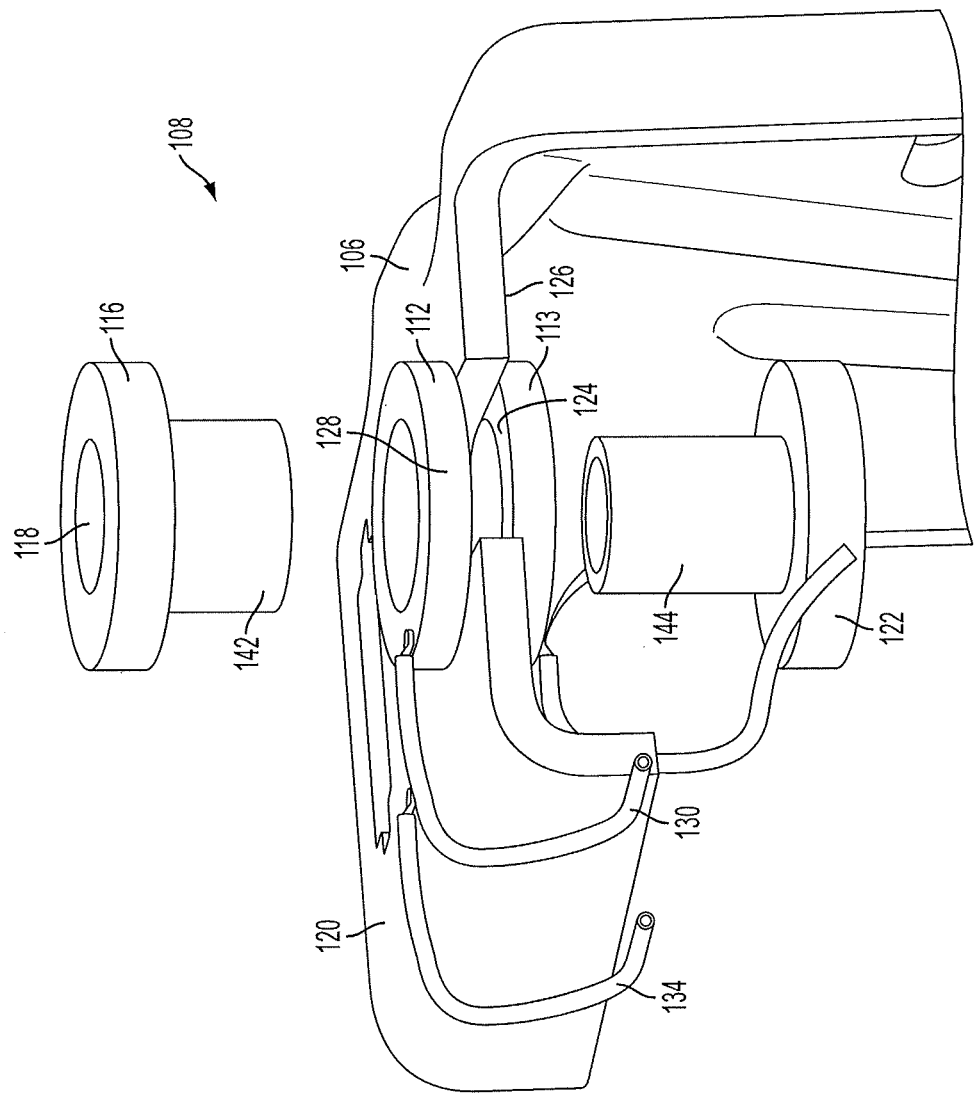
FIG. 9 shows a portion of a steering column assembly with an exploded view of an exemplary controllable coupler.

FIG. 8, FIG. 9, FIG. 11, and FIG. 12 show various views of a controllable coupler 108 comprising a 2-piece grommet assembly 110, which comprises a first axial grommet link 142 and a mating second axial grommet link 144 (not shown in FIG. 8). A first switchable interface 112 is configured as a full (unslotted) piezoelectric disc disposed between a flange lower surface 114 of the upper flange 116 and a bracket upper surface 120 of the position lock bracket 106. A second switchable interface 113 is disposed between a flange upper surface 124 of the lower flange 122 and a bracket lower surface 126 of the position lock bracket 106.

Figure 10:
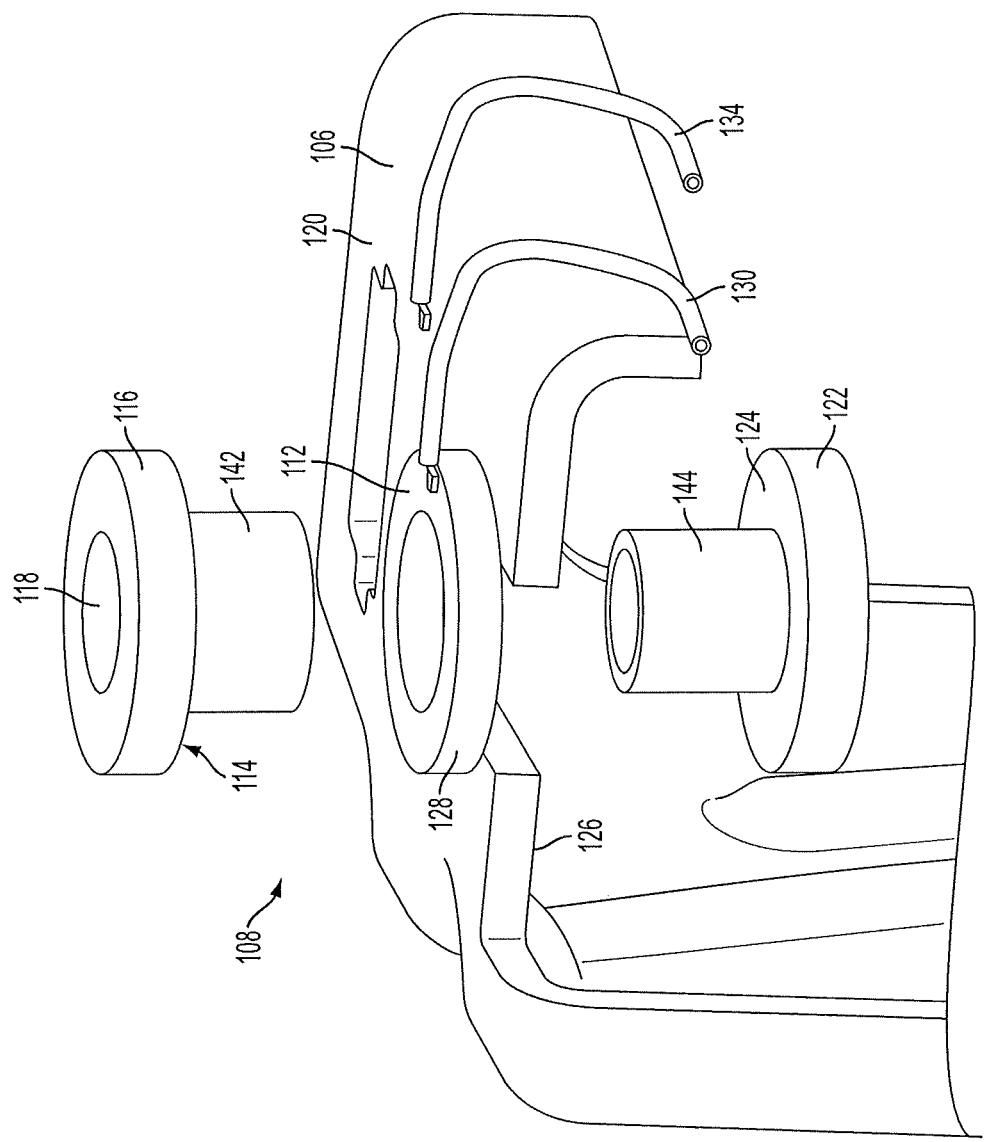
FIG. 10 shows a portion of a steering column assembly with an exploded view of an exemplary controllable coupler.
Figure 11:
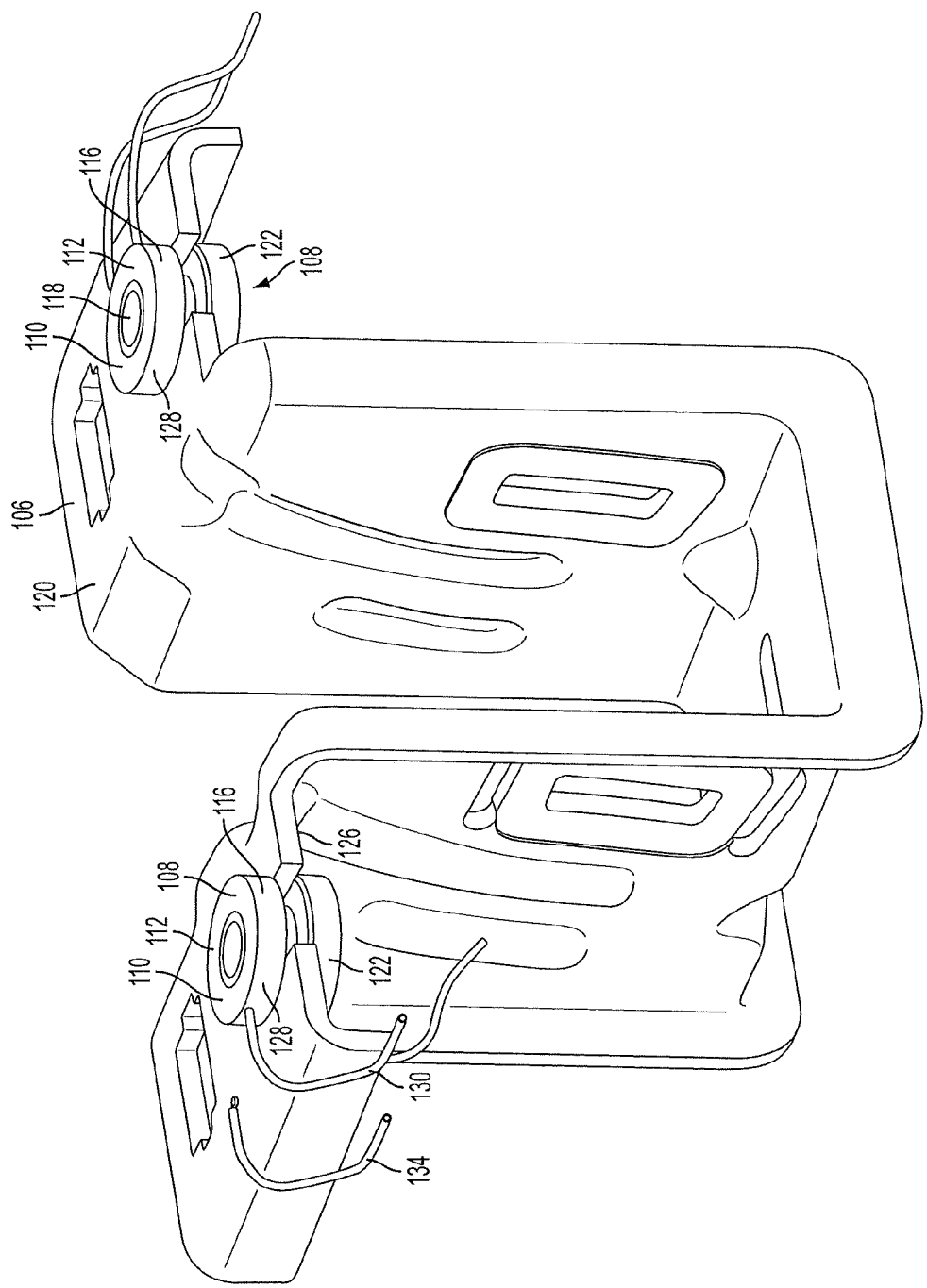
FIG. 11 shows a portion of a steering column assembly with a pair of exemplary controllable couplers.
Figure 12:
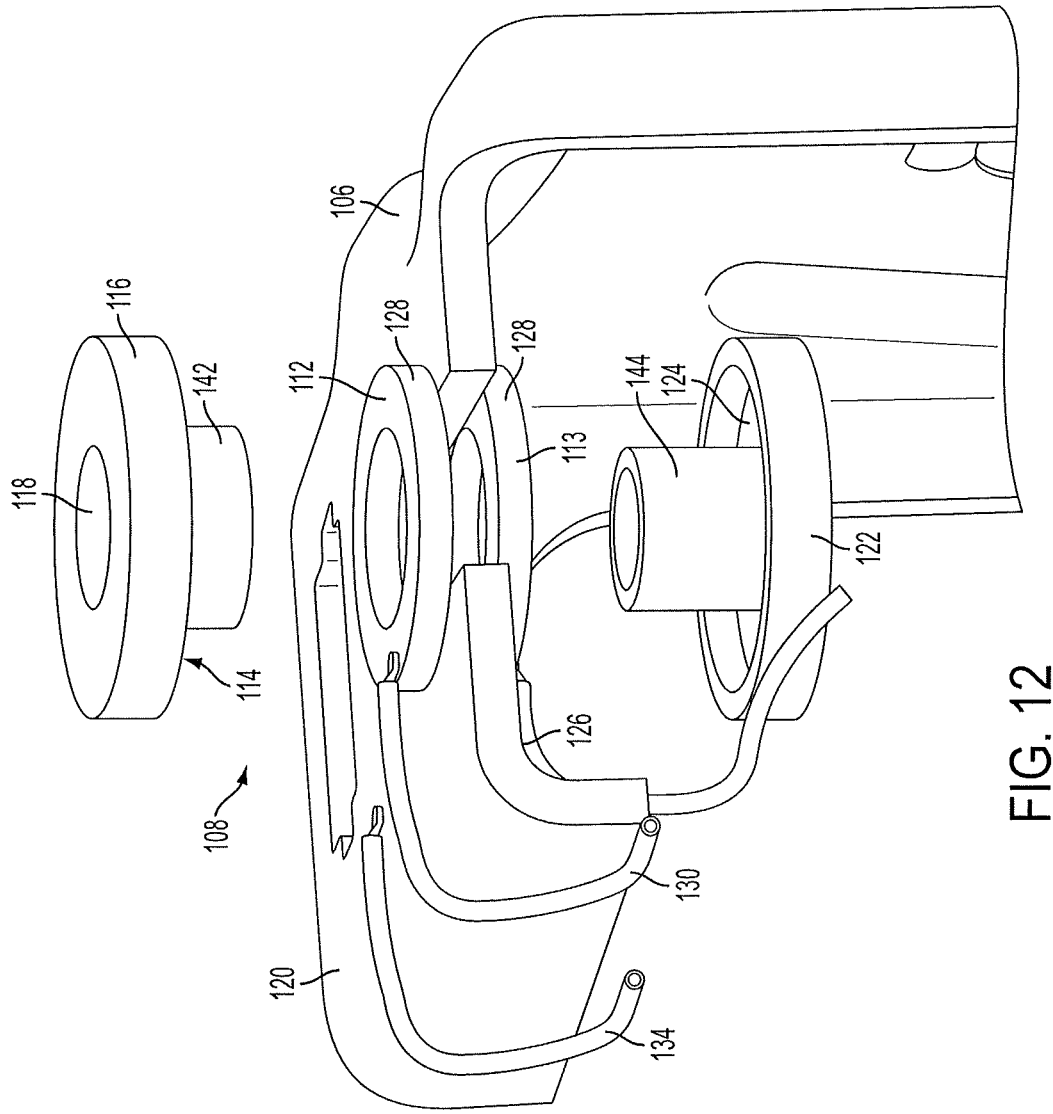
FIG. 12 shows a portion of a steering column assembly with an exploded view of an exemplary controllable coupler.
Figure 13:
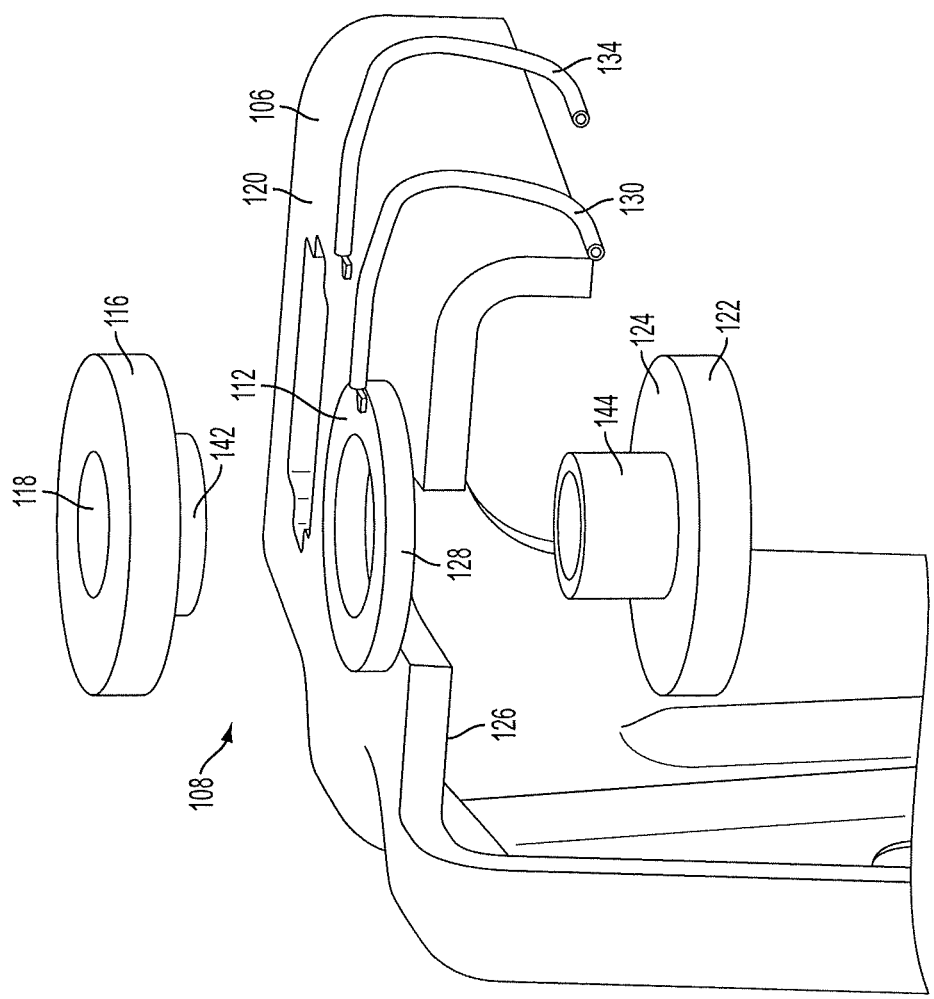
FIG. 13 shows a portion of a steering column assembly with an exploded view of an exemplary controllable coupler.

FIG. 10 and FIG. 13 show various views of a controllable coupler 108 comprising a 2-piece grommet assembly 110, which comprises a first axial grommet link 142 and a mating second axial grommet link 144. A first switchable interface 112 is configured as a full (unslotted) piezoelectric disc disposed between a flange lower surface 114 of the upper flange 116 and a bracket upper surface 120 of the position lock bracket 106.

Figure 14:
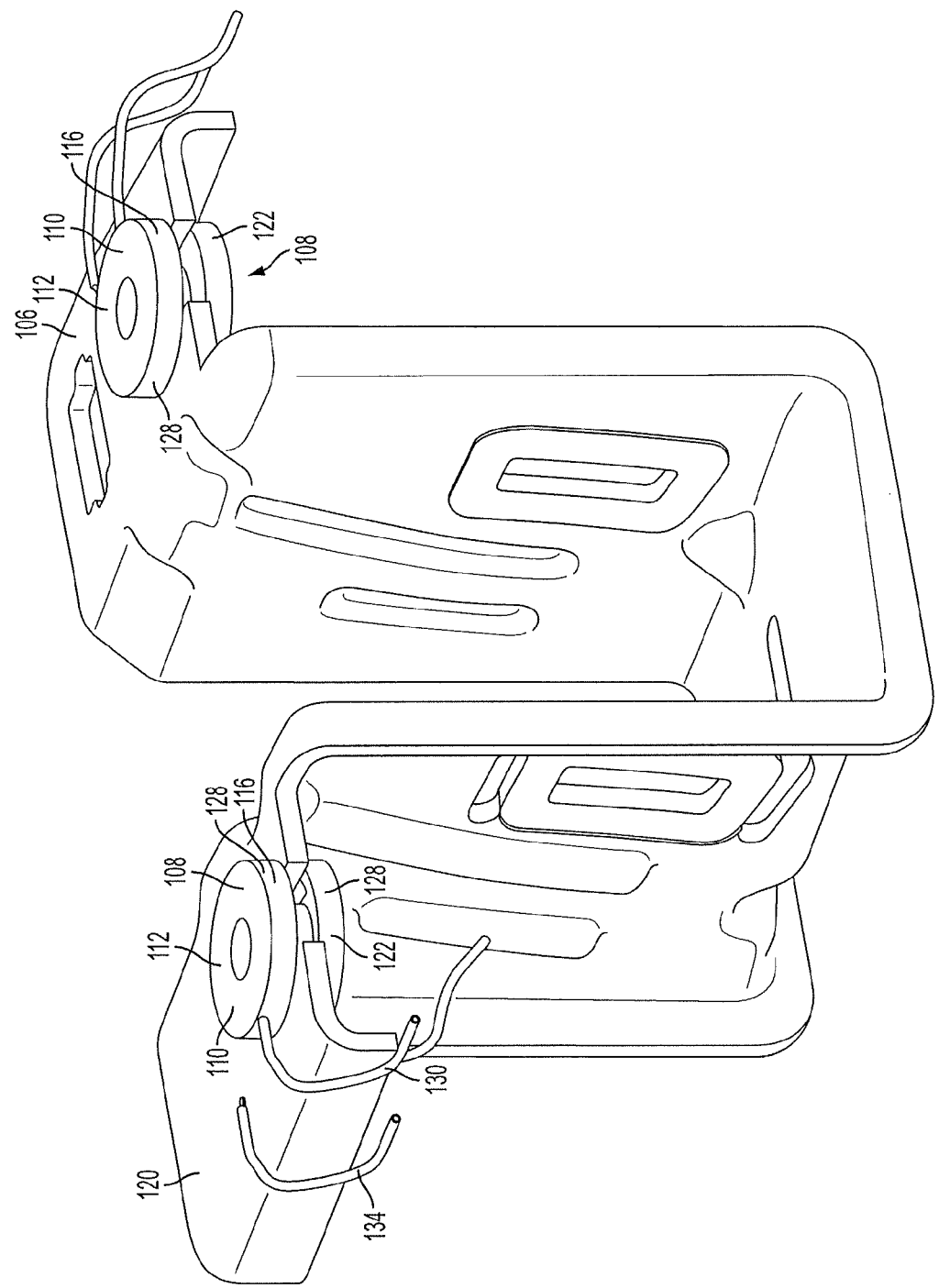
FIG. 14 shows a portion of a steering column assembly with a pair of exemplary controllable couplers.
Figure 15:
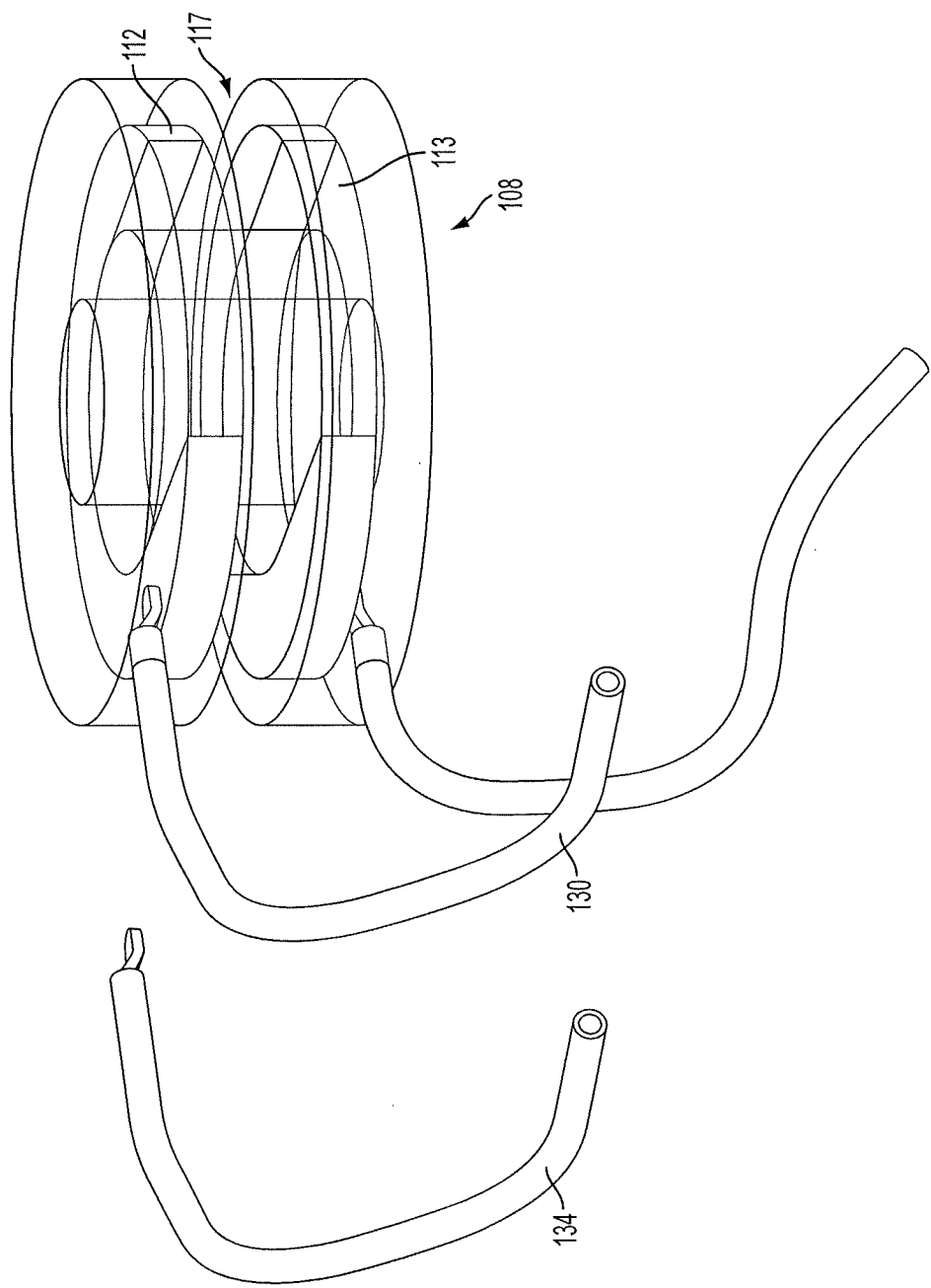
FIG. 15 shows a portion of an exemplary controllable coupler.
Figure 16:
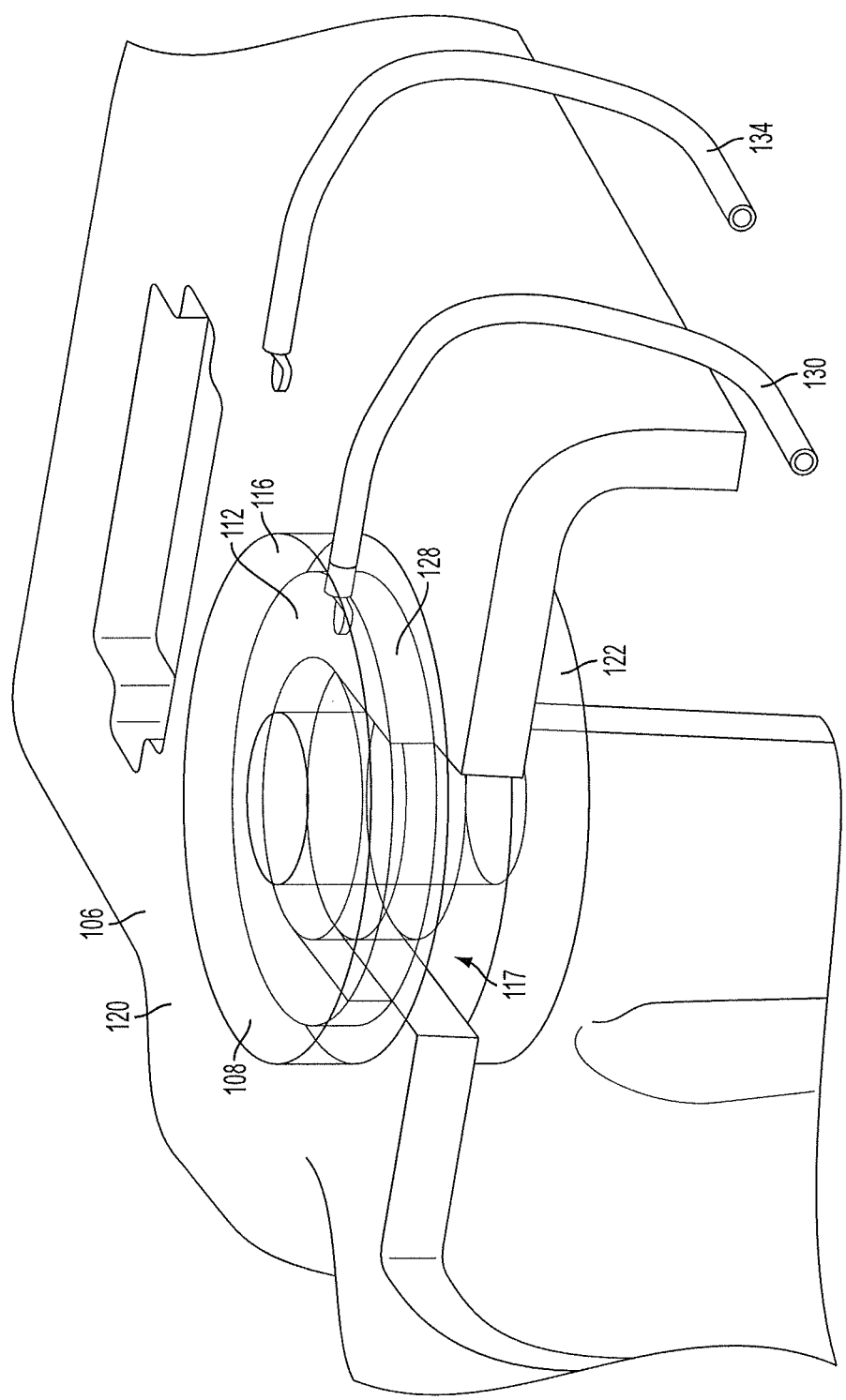
FIG. 16 shows a portion of a steering column assembly with portion of an exemplary controllable coupler.

FIG. 14, FIG. 15 and FIG. 16 show various views of a unitary, controllable coupler 108. A first switchable interface 112 is configured as a full piezoelectric disc and is formed integrally with the upper flange 116. A second switchable interface 113 (FIG. 16) is configured as a full piezoelectric disc and is formed integrally with the lower flange 122. When actuated, the first switchable interface 112 presses against the bracket upper surface 120 of the position lock bracket 106. When actuated, the second switchable interface 113 presses against the bracket lower surface 126 of the position lock bracket 106.

During normal vehicle operation voltage is applied to a piezoelectric layer 128 of a switchable interface 112, 113, causing the piezoelectric material of the switchable interface 112, 113 to expand and to thereby tightly clamp the controllable coupler 108 to the position lock bracket 106.

During a collision event involving the vehicle, the controllable coupler 108 releases, enabling the position lock bracket 106 to separates from the vehicle structure and enabling the steering column assembly to dissipate kinetic energy of a vehicle occupant.

In an exemplary embodiment, a method for coupling a steering column assembly to a vehicle structure includes providing an upper column for supporting a steering wheel and disposing a position lock bracket about the upper column. The position lock bracket is fixedly attached to a rigid structure of the vehicle. The position lock bracket is configured to be instantaneously released from the vehicle structure when operating in a release mode. The position lock bracket is fixedly attached to the upper column when the position lock bracket occupies a locked mode. In an exemplary embodiment, a method for coupling a steering column assembly to a vehicle structure includes releasing the position lock bracket from the vehicle structure upon the occurrence of a predefined event. The predefined event may be a vehicle acceleration that exceeds a threshold magnitude.

In an exemplary embodiment, the method may also include configuring a controllable coupler of the position lock bracket so as to selectively fix the position lock bracket to a rigid structure of the vehicle when operating in a fixed mode and to release the position lock bracket from the vehicle structure when operating in a release mode. Still further, the method may include configuring the controllable coupler so as to include a structural grommet assembly that comprises an upper flange coupled to a lower flange by an axial member, so as to define, between the upper flange and the lower flange, an internal gap for placement of a portion of the position lock bracket. At least one of the upper flange and the lower flange may be configured so as to comprise a piezoelectric material. Similarly, the axial member may be formed of a piezoelectric material. A switchable interface may be disposed between the upper flange and the lower flange, further comprising configuring the switchable interface to be dimensionally responsive to a change in an electromotive potential. In another embodiment, at least two switchable interfaces may be disposed between the upper flange and the lower flange, and the switchable interfaces may be configured to be dimensionally responsive to a change in an electromotive potential. The switchable interface may be configured as a disk.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
an upper column for supporting a steering wheel;
a position lock bracket disposed about the upper column;
the position lock bracket being configured to be fixed to the upper column when the position lock bracket occupies a locked mode;
the position lock bracket being further configured to be selectively fixed to a rigid structure of a vehicle when operating in a fixed mode and to be instantaneously released from the vehicle structure when operating in a release mode;
wherein the position lock bracket comprises a controllable coupler configured to selectively fix the position lock bracket to the rigid structure of the vehicle when operating in the fixed mode and to release the position lock bracket from the vehicle structure when operating in the release mode;
wherein the controllable coupler comprises a structural grommet assembly comprising an upper flange coupled to a lower flange by an axial member, the upper flange and the lower flange defining an internal a for placement of a portion of the position lock bracket; and
wherein at least one of the upper flange and the lower flange comprises a piezoelectric material.

2. The steering column assembly of claim 1, wherein the position lock bracket is configured to instantaneously release the position lock bracket from the vehicle structure upon the occurrence of a predefined event.

3. The steering column assembly of claim 2, wherein the predefined event is a vehicle acceleration that exceeds a threshold magnitude.

4. A steering column assembly comprising:
an upper column for supporting a steering wheel;
a position lock bracket disposed about the upper column;
the position lock bracket being configured to be fixed to the upper column when the position lock bracket occupies a locked mode;
the position lock bracket being further configured to be selectively fixed to a rigid structure of a vehicle when operating in a fixed mode and to be instantaneously released from the vehicle structure when operating in a release mode;
wherein the position lock bracket comprises a controllable coupler configured to selectively fix the position lock bracket to the rigid structure of the vehicle when operating in the fixed mode and to release the position lock bracket from the vehicle structure when operating in the release mode;
wherein the controllable coupler comprises a structural grommet assembly comprising an upper flange coupled to a lower flange by an axial member, the upper flange and the lower flange defining an internal gap for placement of a portion of the position lock bracket; and
wherein the axial member comprises a piezoelectric material.

5. A steering column assembly comprising:
an upper column for supporting a steering wheel;
a position lock bracket disposed about the upper column;
the position lock bracket being configured to be fixed to the upper column when the position lock bracket occupies a locked mode;
the position lock bracket being further configured to be selectively fixed to a rigid structure of a vehicle when operating in a fixed mode and to be instantaneously released from the vehicle structure when operating in a release mode;
wherein the position lock bracket comprises a controllable coupler configured to selectively fix the position lock bracket to the rigid structure of the vehicle when operating in the fixed mode and to release the position lock bracket from the vehicle structure when operating in the release mode;
wherein the controllable coupler comprises a structural grommet assembly comprising an upper flange coupled to a lower flange by an axial member, the upper flange and the lower flange defining an internal gap for a placement of a portion of the position lock bracket; and
wherein the controllable coupler comprises a switchable interface disposed between the upper flange and the lower flange, the switchable interface being configured to be dimensionally responsive to a change in an electromotive potential.

6. The steering column assembly of claim 5, wherein the switchable interface is configured as a disk.

7. A steering column assembly comprising:
an upper column for supporting a steering wheel;
a position lock bracket disposed about the upper column;
the position lock bracket being configured to be fixed to the upper column when the position lock bracket occupies a locked mode;
the position lock bracket being further configured to be selectively fixed to a rigid structure of a vehicle when operating in a fixed mode and to be instantaneously released from the vehicle structure when operating in a release mode;
wherein the position lock bracket comprises a controllable coupler configured to selectively fix the position lock bracket to the rigid structure of the vehicle when operating in the fixed mode and to release the position lock bracket from the vehicle structure when operating in the release mode;

wherein the controllable coupler comprises a structural grommet assembly comprising an upper flange coupled to a lower flange by an axial member, the upper flange and the lower flange defining an internal gap for placement of a portion of the position lock bracket; and wherein the controllable coupler comprises at least two switchable interfaces disposed between the upper flange and the lower flange, the switchable interfaces being configured to be dimensionally responsive to a change in an electromotive potential.

8. A method for coupling a steering column assembly to a vehicle structure comprising:

providing an upper column for supporting a steering wheel;

disposing a position lock bracket about the upper column;

fixing the position lock bracket to a grid structure of a vehicle and configuring the position lock bracket to be instantaneously released from the vehicle structure when operating in a release mode;

fixing the position lock bracket to the upper column when the position lock bracket occupies a locked mode;

configuring a controllable coupler of the position lock bracket so as to selectively fix the position lock bracket to the rigid structure of the vehicle when operating in a fixed mode and to release the position lock bracket from the vehicle structure when operating in the release mode;

configuring the controllable coupler so as to include a structural grommet assembly that comprises an upper flange coupled to a lower flange by an axial member, further comprising defining, between the upper flange and the lower flange, an internal gap for placement of a portion of the position lock bracket; and forming at least one of the upper flange and the lower flange so as to comprise a piezoelectric material.

9. The method of claim 8, further comprising releasing the position lock bracket from the vehicle structure upon the occurrence of a predefined event.

10. The method of claim 9, wherein the predefined event is a vehicle acceleration that exceeds a threshold magnitude.

11. A method for coupling a steering column assembly to a vehicle structure comprising:

providing an upper column for supporting a steering wheel;

disposing a position lock bracket about the upper column;

fixing the position lock bracket to a rigid structure of a vehicle and configuring the position lock bracket to be instantaneously released from the vehicle structure when operating in a release mode;

fixing the position lock bracket to the upper column when the position lock bracket occupies a locked mode;

configuring a controllable coupler of the position lock bracket so as to selectively fix the position lock bracket to the rigid structure of the vehicle when operating in a fixed mode and to release the position lock bracket from the vehicle structure when operating in the release mode;

configuring the controllable coupler so as to include a structural grommet assembly that comprises an upper flange coupled to a lower flange by an axial member, further comprising defining, between the upper flange and the lower flange, an internal gap for placement of a portion of the position lock bracket; and forming the axial member of a piezoelectric material.

12. A method for coupling a steering column assembly to a vehicle structure comprising:

providing an upper column for supporting a steering wheel;

disposing a position lock bracket about the upper column;

fixing the position lock bracket to a rigid structure of a vehicle and configuring the position lock bracket to be instantaneously released from the vehicle structure when operating in a release mode;

fixing the position lock bracket to the upper column when the position lock bracket occupies a locked mode;

configuring a controllable coupler of the position lock bracket so as to selectively fix the position lock bracket to the rigid structure of the vehicle when operating in a fixed mode and to release the position lock bracket from the vehicle structure when operating in the release mode;

configuring the controllable coupler so as to include a structural grommet assembly that comprises an upper flange coupled to a lower flange by an axial member, further comprising defining, between the upper flange and the lower flange, an internal gap for placement of a portion of the position lock bracket; and disposing a switchable interface between the upper flange and the lower flange, further comprising configuring the switchable interface to be dimensionally responsive to a change in an electromotive potential.

13. The method of claim 12, comprising configuring the switchable interface as a disk.

14. A method for coupling a steering column assembly to a vehicle structure comprising:

providing an upper column for supporting a steering wheel;

disposing a position lock bracket about the upper column;

fixing the position lock bracket to a rigid structure of a vehicle and configuring the position lock bracket to be instantaneously released from the vehicle structure when operating in a release mode;

fixing the position lock bracket to the upper column when the position lock bracket occupies a locked mode;

configuring a controllable coupler of the position lock bracket so as to selectively fix the position lock bracket to the rigid structure of the vehicle when operating in a fixed mode and to release the position lock bracket from the vehicle structure when operating in the release mode;

configuring the controllable coupler so as to include a structural grommet assembly that comprises an upper flange coupled to a lower flange by an axial member, further comprising defining, between the upper flange and the lower flange, an internal gap for placement of a portion of the position lock bracket; and disposing at least two switchable interfaces between the upper flange and the lower flange, further comprising configuring the switchable interfaces to be dimensionally responsive to a change in an electromotive potential.

* * * * *